(12) United States Patent
Aydore et al.

(10) Patent No.: US 11,537,902 B1
(45) Date of Patent: Dec. 27, 2022

(54) DETECTING ANOMALOUS EVENTS FROM CATEGORICAL DATA USING AUTOENCODERS

(71) Applicant: Amazon Technologies, Inc., Seattle, WA (US)

(72) Inventors: Sergul Aydore, New York, NY (US); Baris Coskun, Glen Rock, NJ (US); Luca Melis, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 16/912,527

(22) Filed: Jun. 25, 2020

(51) Int. Cl.
*G06F 16/245* (2019.01)
*G06N 3/08* (2006.01)
*G06N 3/04* (2006.01)

(52) U.S. Cl.
CPC .......... *G06N 3/088* (2013.01); *G06F 16/245* (2019.01); *G06N 3/0454* (2013.01)

(58) Field of Classification Search
CPC ..... G06N 3/088; G06N 3/0454; G06F 16/245
USPC ........................................................ 706/17
See application file for complete search history.

(56) References Cited

U.S. PATENT DOCUMENTS

2019/0205785 A1* 7/2019 Volk ..................... G06N 3/0454
2021/0224606 A1* 7/2021 Lee ...................... G06N 3/0472

* cited by examiner

*Primary Examiner* — Charlotte M Baker
(74) *Attorney, Agent, or Firm* — Eversheds Sutherland (US) LLP

(57) ABSTRACT

Systems, devices, and methods are provided for detecting anomalous events from categorical data using autoencoders. A system may receive a data set associated with actions requested within the computing environment, wherein the data set includes first categorical data indicative of anomalous activity in the computing environment. The system may train an autoencoder to reconstruct approximations of requests associated with the computing environment based on the received data set, wherein training the autoencoder includes using a beta divergence and a maximum mean discrepancy divergence. The trained system may receive a request to invoke an action within the computing environment, may generate a reconstruction of the request to invoke the action using the trained autoencoder, may determine a normalcy score based on a probability that the reconstruction of the request exists in the training data set, and, based on the calculated normalcy score, may determine whether requests indicate anomalous data.

20 Claims, 10 Drawing Sheets

DETECTING ANOMALOUS EVENTS FROM CATEGORICAL DATA USING AUTOENCODERS

BACKGROUND

Computer-based systems increasingly are being used to detect anomalous events in a distributed computing system. Users of a distributed computing system may perform actions within a distributed computing system according to a pattern of activity. Actions having attributes that are significantly different from the attributes of historical actions may constitute potentially anomalous activity. Some computer-based systems trained to detect anomalous actions in a distributed computing system may not be trained to analyze categorical data with significant cardinality, and may not account for the possible presence of anomalies in the training data used to train a computer-based system. Therefore, computer-based systems may benefit from enhanced detection of anomalous events.

Figure 1A:
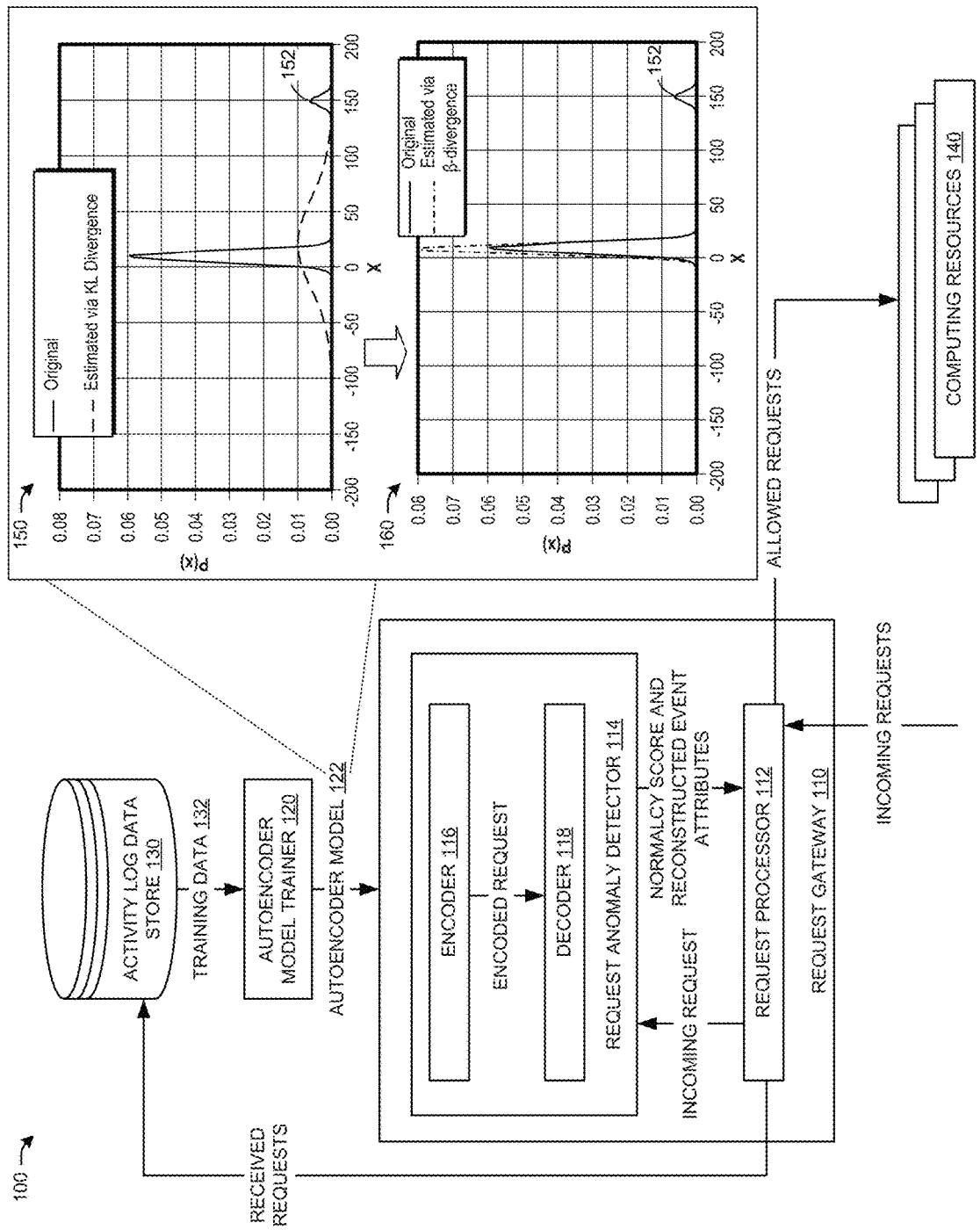
FIG. 1A illustrates an example distributed computing environment in which an autoencoder is used to determine whether incoming requests to perform actions within the distributed computing environment are potentially anomalous actions, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for detecting anomalous events from categorical data using autoencoders.

Computer-based systems increasingly are being used to detect anomalous events in a distributed computing system. Users of a distributed computing system may perform actions within the distributed computing system according to a pattern of activity. For example, users may request the creation and termination of cloud computing instances in the distributed computing system according to a roughly defined schedule, such as the beginning and end of a work day. In another example, users may log into and out of the distributed computing system at particular times and from particular locations. Because users of a distributed computing system generally perform various actions according to a regular pattern of activity, it may be assumed that future requests that have similar attributes as the attributes of historical requests is likely non-anomalous activity. Similarly, requests having attributes that are significantly different from the attributes of historical requests may constitute potentially anomalous activity, and thus may be subject to further examination prior to allowing or disallowing processing of the request. Anomalous activity may be associated with attempted attacks or other disruptions of a distributed computing system.

User activity in a distributed computing system may include a large number of records, and any record may include highly dimensional attributes describing each record. These attributes may include various data points that may be used to determine whether a request is non-anomalous or potentially anomalous. Some of the attributes also may be highly dimensional, such as information identifying the system from which a request was received, which may have $2^{32}$ possible values for IPv4 addresses or $2^{128}$ possible values for IPv6 addresses. Further, various aspects of user activity may complicate determinations of whether requests in a computing system are potentially anomalous or non-anomalous. For example, some requests may be anomalous with respect to a global data set of historical requests to invoke actions in a distributed computing environment. However, that a request may be anomalous within the global set of historical requests, a request that may be anomalous with respect to a global data set may not necessarily indicate that such a request is actually anomalous for the specific user associated with the request. In another example, numerous users may perform activity consistent with pattern; however, this pattern of activity may be anomalous for a user that does not operate on the same schedule.

Autoencoders, such as variational autoencoders (VAEs), Wasserstein autoencoders, or other models that encode data into a latent space and reconstruct approximations of the data from an encoding in the latent space may be used to recognize potentially anomalous activity within a distributed computing system based on historical user activity within the distributed computing system. Autoencoders may be used to compress data, such as image data, allowing for reconstruction of the original data after compression. However, some computer-based systems may not use autoencoders to analyze categorical data, such as highly dimensional attributes of distributed computing system records as described above, and may not account for the possible presence of anomalies in training data for the autoencoders.

A VAE is a probabilistic graphical model that includes an encoder and a decoder. An advantage of VAEs over some other autoencoders is that VAEs may learn the distribution of data that provides a reconstruction probability rather than a reconstruction error as an anomaly score. The encoder of a VAE transforms high-dimensional input data, such as data with many attributes, with an intractable probability distribution into a low-dimensional code with an approximate variational distribution that is tractable. The decoder of the VAE samples from the variational distribution of the code and transforms the sample into a reconstruction of the input. VAEs use the concept of variational inference and reparameterize the variational evidence lower bound (ELBO) so that it may be optimized. A VAE may learn latent features that best describe the distribution of data, and allows the generation of new samples using the decoder. VAEs may be trained using datasets to detect anomalies, in which characteristics of the anomalies differ from characteristics of the training data.

The training data for an autoencoder may be considered a "ground truth," but outliers in the training data may undermine performance of the autoencoder. For example, when autoencoder training data includes anomalous data, the autoencoder may operate under the premise that the anomalies in the training data are normal (e.g., not indicative of a potential attack on a distributed computing system), and therefore may not identify actual attempted attacks or other disruptions when analyzing categorical data associated with actions performed in a distributed computing system. In particular, autoencoders may encode and reconstruct anomalies in training data, and may detect anomalies by comparing a test image to its reconstruction. By encoding anomalies, an autoencoder may result in reconstruction of the anomalies in testing samples, thereby undermining the autoencoder's ability to learn to detect anomalies in datasets. Because VAEs may learn representations from normal patterns, and deviations from the normal patterns may be considered abnormal behavior, the identification of a deviation may be less accurate when the normal patterns are derived from training data with anomalous data.

Therefore, autoencoders and distributed computing systems may benefit from enhanced detection of anomalous events using categorical data.

In one or more embodiments, autoencoders may be trained to analyze categorical data using a beta-divergence ($\beta$-divergence) model (e.g., instead of image analysis, Kullback-Leibler (KL) divergence, or other models). The use of $\beta$-divergence (e.g., where $\beta$ represents a divergence coefficient) for autoencoder analysis of categorical data may account for anomalies present in training data used to train autoencoders with maximum mean discrepancy (MMD). MMD may refer to a test statistic used to determine whether two samples are from different distributions. MMD measures the largest difference in expectations over functions in the unit ball of a reproducing kernel Hilbert space (RKHS). For a positive-definite reproducing kernel $k: Z \times Z \rightarrow R$, the MMD between $q_\phi(z|x)$ and $p(z)$ may be defined as:

$$MMD_k(q_\phi(z \mid x), p(z)) = \left\| \int k(z, .) dq_\phi(z \mid x) - \int k(z, .) dp(z) \right\|_{\mathcal{H}_k}$$

where $\mathcal{H}_k$ is the RKHS of real-valued functions mapping Z to R, and the notation of k(z, .) indicates that the kernel has one argument fixed at z, and the other argument is free.

A dataset anomaly may refer to an observation that does not conform to normal patterns in the data. In this manner, training data for a VAE may teach the VAE (e.g., using unsupervised machine learning) to identify normal patterns and deviations from the normal patterns.

VAEs may use generative modeling to learn a mechanism from X to draw new samples such that $X_{new} \sim p_{data}$. VAEs provide a framework to achieve this goal by learning a representation in low-dimensional latent space. The generative process of a VAE may be defined as:

$$z_{new} \sim p(Z) \; x_{new} p_\theta(X|Z=z_{new})$$

where p(Z) is a fixed prior distribution over latent space Z. A decoder of the VAE may map a latent variable to the input space via the likelihood distribution $p_\theta$. The VAE may estimate $p_{data}(x)$ as the infinite mixture model $p_\theta(x) = \int p_\theta(x|z) p(z) dz$. At the same time, the input space may be mapped to the latent space via an encoder of the VAE. Determining the marginal log-likelihood log $p_\theta(x)$ may be intractable, so the VAE may implement a variational approach that maximizes the ELBO for a sample x. Maximizing the ELBO for data X may minimize the loss for a sample x.

A conditional VAE may be trained using the loss function:

$$loss = -logloss_{Event} - logloss_{systemID} + KL$$

where $logloss_{Event}$ represents the performance of the autoencoder in reconstructing an event given context variables c, $logloss_{systemID}$ represents the performance of the autoencoder in reconstructing the identification of the system from which a request was received given context variables c, and KL represents the KL distance between two probability distributions.

The reconstruction loss for a single sample using KL divergence may be:

$$\mathcal{L}_{REC}^i = N \mathbb{E}_{z \sim q_\phi(z|x)}[\mathbb{KL}^i].$$

Reliance on the loss function to train VAEs may result in high penalty scores for anomalous data, and may undermine the VAE's ability to detect anomalies. VAEs may minimize reconstruction cost and a regularizer that penalizes (e.g., by assigning a penalty score) any discrepancy between prior distributions of latent representations and distributions induced by an encoder. MMD as a regularizer may allow for deterministic mapping from input to latent space. In one or more embodiments, a VAE may use MMD divergence in the regularizer.

In one or more embodiments, the loss function above may be replaced with $\beta$-divergence formulation that minimizes a $\beta$-divergence-based loss function derived from categorical variables and that minimizes MMD. VAEs may extract a lower-dimensional encoded feature representation from which may be generated new data samples. Robustness of autoencoders to anomalies is important for generating a reliable representation of data types in the encoded space when using corrupted training data (e.g., training data including anomalies). By using $\beta$-divergence for a range of image datasets, VAE robustness may be improved when compared to some existing VAE methods. $\beta$-divergence may be more forgiving in that the penalty scores for detected anomalies may be reduced when compared to using the loss function above, and the result may be improved anomaly detection.

In one or more embodiments, a distributed computing system may use one or more services to enable governance, compliance, and auditing of the distributed computing system. The one or more services may log, monitor, and retain account activity related to any actions across the infrastructure of the distributed computing system, such as actions taken with an account management service, software development kits, virtual private clouds, command line tools, and other services and resources. A threat detection service of the distributed computing system may use a VAE to continuously monitor actions for malicious activity and unauthorized behavior by detecting anomalies among actions from large categorical datasets. By training the VAE to account for noisy training data (e.g., training data including anomalous data), the ability of the threat detection service to identify malicious and unauthorized actions may be improved. For example, the categorical data indicative of actions may be modeled by data clusters having multiple attributes (e.g., user identifier, address, etc.). The VAE may compress the categorical data and reconstruct the categorical data based on the training data. In this manner, using (β-divergence to train the VAE to analyze categorical data may improve the VAE's ability to detect undesirable behavior associated with the distributed computing system. In addition, using MMD instead of KL divergence may reduce the number of samples required by a VAE for decoding.

In one or more embodiments, minimizing β-divergence may be equivalent to minimizing (β-cross-entropy. To apply a VAE to categorical data, a generative distribution may be a categorical distribution having K categories. β-cross-entropy for a single point may be defined as:

$$\mathbb{H}_\beta^i = -\frac{\beta+1}{\beta}\frac{1}{N}\left(p_\theta(x_i\mid z)^\beta - 1\right) + \frac{1}{N}\sum_{k=1}^{K} p_\theta(X == k\mid z)^{\beta+1}$$

where $p_\theta(x)$ is an infinite mixture model for sample $x_i$, and where k represents a kernel with which to determine the MMD. The reconstruction loss for a single sample using (β-divergence may be represented as:

$$\mathcal{L}_{REC\text{-}\beta}^i = N\mathbb{E}_{z\sim q_\phi(z\mid x)}[\mathbb{H}_\beta^i]$$

In one or more embodiments, the VAE may use concepts of β-cross-entropy and MMD as described above. For example, the cost function to be optimized may be represented as:

$$\phi, \theta = \underset{\phi,\theta}{\operatorname{argmin}} \mathbb{E}_{x\sim p_{data}(x)}\left[\mathcal{L}_{REC\text{-}\beta} + \mathcal{L}_{MMD}\right]$$

where $L_{REC\text{-}\beta}$ represents the loss term per sample introduced in the reconstruction loss for a single sample using β-divergence equation shown above, and $L_{MMD}$ is the regularization term that uses MMD as a dissimilarity measure in latent dimension.

In one or more embodiments, the VAE may use a non-random decoder $p_\theta(x\mid z)$, which may indicate that latent variable z may be mapped to the original dimension variables x. The algorithm used to train the VAE using a robust VAE (RVAE) with MMD divergence (RVAE-MMD) is presented below in Algorithm 1.

Algorithm 1: Training a VAE with RVAE MMD
Input:
Initialize the parameters of the encoder $q_\phi(z\mid x)$ and the decoder $p\theta(x\mid z)$.
Define the kernel k to determine MMD.
Robust divergence coefficient $\beta \geq 0$.
Output: $\phi$, $\theta$
1: While $\phi$ and $\theta$ are not converged, do:
2: Sample $\{x_1, \ldots, x_N\}$ from the training set.
3: Sample $\{z_1, \ldots, z_N\}$ from the prior p(z).
4: Sample $\{z\sim_1, \ldots, z_N\}$ from $q_\phi(z\mid x)$.
5. Compute β-divergence term:

$$\mathcal{L}_{REC\text{-}\beta} = -\frac{\beta+1}{N\beta}\sum_{i=1}^{N}\left(p_\theta(x_i\mid z_i)^\beta - 1\right) + \sum_{k=1}^{K} p_\theta(X == k\mid z_i)^{\beta+1}$$

6: Compute MMD term:

$$\mathcal{L}'_{MMD} = \frac{1}{N(N-1)}\sum_{i=1}^{N}\sum_{j\neq i}^{N} k(z_i, z_j) + \frac{1}{N(N-1)}\sum_{i=1}^{N}\sum_{j\neq i}^{N} k(\tilde{z}_i, \tilde{z}_j) - \frac{1}{N^2}\sum_{i=1}^{N}\sum_{j=1}^{N} k(z_i, \tilde{z}_j)$$

7: Update $\phi$ and $\theta$ by descending the total loss: $\mathcal{L}_{TOT} = \mathcal{L}_{REC\text{-}\beta} + \mathcal{L}_{MMD}$
8: end while
9: Return $\phi$, $\theta$.

As described above, a threat detection service (e.g., anomaly detector) of a distributed computing system may monitor events to identify threats based on the identification of anomalous event data. Some threat detection services may be rule-based, thereby requiring manual definition of rules rather than allowing for machine learning and automatic determination of rules. Rule-based decisions of some threat detection services may experience significant false positive rate because, for example, users of the distributed computing system regularly may generate new, but legitimate activities. In one or more embodiments, to automate the threat detection process, VAEs may be trained to use machine learning algorithms. When the VAE machine learning algorithms use β-divergence with MMD for categorical data, the distribution determined using optimized β-divergence may be more robust to data anomalies than other methods, such as KL divergence.

In one or more embodiments, autoencoders trained β-divergence with MMD may implement unsupervised learning (e.g., without data labels) in which the autoencoders may identify anomalies within categorical data (e.g., representing actions requested and/or performed within a distributed computing environment). The training data set used to train the autoencoders may include unlabeled data, and the autoencoder may be trained using unsupervised learning techniques so that the autoencoder may learn encoded data and decoded data of non-anomalous requests (e.g., requests that are expected to be received for a given context).

While the equations presented herein provide examples of using β-divergence with MMD to train autoencoders to identify anomalies among categorical data, the equations are not meant to be limiting. Other techniques for using β-divergence with MMD to train autoencoders to identify anomalies among categorical data may apply.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1A illustrates an example distributed computing environment 100 in which an autoencoder is used to determine whether incoming requests to perform actions within the distributed computing environment are potentially anomalous actions, in accordance with one or more example embodiments of the present disclosure.

Referring to FIG. 1A, the computing environment 100 may include a request gateway 110, an autoencoder model trainer 120, an activity log data store 130, and one or more computing resources 140.

The request gateway 110 may serve as a publicly-facing system through which users of the distributed computing environment 100 may request the performance of various actions (e.g., GET calls, PUT calls, requests to access resources and services, etc.) within the computing environment 100 (e.g., through the execution of one or more functions on computing resources 140). The request gateway 110 may receive requests from users of the computing environment 100 or from a historical data log of activity within the computing environment 100, and may determine a normalcy score for any request based on an autoencoder that attempts to reconstruct the request from an encoding of the request. The request gateway 110 may use the calculated normalcy score to determine whether an request is potentially anomalous, and take action to process or not process the request based on the determination of whether a request is potentially anomalous. As illustrated, the request gateway 110 may include a request processor 112 and a request anomaly detector 114.

The request processor 112 may receive incoming requests from client devices that instruct the computing environment 100 to perform one or more actions with respect to computing resources 140. The request processor 112 may provide information about the incoming request (e.g., event attributes defining the properties of the requested event, also referred to herein as "request attributes," and contextual attributes defining information about the user that generated the request) to request the anomaly detector 114 to obtain a normalcy score. When the request processor 112 receives the normalcy score from the request anomaly detector 114, the request processor 112 may examine the normalcy score to determine whether the incoming request represents a potentially anomalous request for the user. In some embodiments, a normalcy score close to 1 may indicate that the incoming request is similar to non-anomalous requests used to train an autoencoder, and may indicate that the incoming request is likely to correspond to non-anomalous activity. Conversely, a normalcy score close to 0 may indicate that the incoming request is not similar to any of the non-anomalous requests used to train the autoencoder, and may indicate that the incoming request potentially corresponds to anomalous activity within the computing environment 100.

When the request processor 112 determines that the incoming request is a non-anomalous request, the request processor 112 may execute the action(s) identified in the incoming request against the computing resources 140 specified in the incoming request. For example, the actions may include authenticating a user, instantiating or terminating cloud computing instances, instantiating or deallocating dynamic storage systems for the user, changing routing information for the user, changing a geographic location at which cloud computing instances are instantiated, and other operations that may be performed to configure and operate cloud computing instances in a dynamically scalable computing environment.

When the request processor 112 determines that the incoming request is a potentially anomalous request, the request processor 112 may perform one or more actions to verify that the request is a legitimate request, or to determine that the request is an anomalous request that should not be executed. In some embodiments, the request processor 112 may use information about the user identified in the incoming request to obtain contact information for the user and to push, to the user, a request to verify that the incoming request was generated by the user. For example, user information included in the incoming request (e.g., user account information, such as a user name, an account identifier, etc.) may be used to find user contact information, such as a mobile phone number or e-mail address, in a user database. A notification (e.g., in the form of a short message service (SMS) or multimedia message service (MMS) message, an e-mail, a voice call, a push notification through an application installed on a user's computing device, etc.) may be generated to request that a user confirm that the incoming request represents legitimate activity. When the user confirms that the incoming request is legitimate activity, the request processor 112 may execute the action(s) identified in the incoming request against the computing resources 140 specified in the incoming request, or otherwise unblock execution of the action(s) identified in the incoming request. When the user indicates that the incoming request corresponds to illegitimate activity or does not respond to the request, the request processor 112 may drop the incoming request such that no action is performed against computing resources 140 in response to receipt of the incoming request.

The request processor 112 may write information about the incoming requests received at request processor 112 to an activity log data store 130 for use in training and re-training the anomaly detection model used by the request anomaly detector 114 to determine whether incoming requests are potentially anomalous for a given user. In some embodiments, the request processor 112 may write information about non-anomalous events to activity the log data store 130 such that information about anomalous events may not be used to train the anomaly detection model. In some embodiments, user feedback regarding potentially anomalous events may be used to augment the historical user activity data stored in the activity log data store 130 to improve the accuracy at which an anomaly detection model executed by the request anomaly detector 114 determines whether incoming requests correspond to anomalous or non-anomalous activity. For example, when a user indicates that an incoming request flagged as potentially anomalous is, in fact, non-anomalous, information about the incoming request may be tagged with an indication that the incoming request corresponds to legitimate activity for the user. When the anomaly detection model is re-trained (which may occur on-demand or periodically), the anomaly detection model may take into account activity marked as legitimate to generate one or more rules for identifying similar activity as non-anomalous activity in the future.

Some amount of anomalous events may be expected to occur for each user of the computing resources 140 in the computing environment 100 during typical operations within the computing environment 100. However, a spike or other abnormality in the number of anomalous events detected for a given user of computing environment 100 within a given time period may be indicative of illegitimate activity being generated by the user (e.g., due to compromised credentials allowing other persons to impersonate a user, malware programmed to hijack a user's cloud computing instances, etc.). To determine whether the rate at which anomalous activity is generated for a user is within an expected amount during a given window of time, the request processor 112 may maintain a counter that tracks a number of potentially anomalous events generated by each user of the computing environment 100 over the window of time. When the counter tracking events flagged as potentially anomalous by the request anomaly detector 114 exceeds a threshold number of events over a time window, the request processor 112 may take one or more actions to verify that the user has not been compromised and, if so, take one or more actions to rectify any compromise of user credentials or otherwise attempt to reduce the occurrence of potentially anomalous activity generated by the user.

The request anomaly detector 114 may determine a normalcy score for each request to be analyzed using an autoencoder 122 (e.g., autoencoder model) trained by the autoencoder model trainer 120 using historical user activity from the activity log data store 130 (e.g., training data 132), as discussed in further detail below. The normalcy score calculated for each request may, in some embodiments, be a conditional probability calculated based on a distance between a reconstructed version of the request to be analyzed and the request to be analyzed, and the normalcy score may represent a likelihood that the request to be analyzed falls is similar to the non-anomalous requests used to train an autoencoder (e.g., requests included in the training data 132). To improve the detection of anomalous data, the distance may be based on β-divergence rather than KL divergence, for example, as explained further herein.

The request anomaly detector 114 may include an encoder 116 and a decoder 118 (e.g., representing an autoencoder). The encoder 116 and the decoder 118 may be components of an autoencoder, such as a VAE or a Wasserstein autoencoder, that generates reconstructions of an input by encoding the input into a code in a latent space and decoding the code into the reconstruction of the input. In some embodiments, the autoencoder may identify small variations of an a priori known request as a non-anomalous request (e.g., a request having a probability of being in the training data 132 of non-anomalous requests close to 1), while larger differences between an incoming request and the a priori known requests used to train the autoencoder may be recognized as potentially anomalous requests (e.g., a request having a probability of being in the training data 132 of non-anomalous requests close to 0).

To determine an anomaly score for an incoming request, the anomaly detector 114 may receive information about a request from the request processor 112 or from historical requests stored in the activity log data store 130. Any request may be defined as a set of event attributes and a set of contextual attributes. The set of event attributes may include, for example, information about the requested action, parameters for the requested action, the source system from which the request was received, and the like. In some embodiments, the information about the source system from which the request was received may include an Autonomous System Number (ASN) of the network from which the request was received. Because IP addresses may change over time, and because IP addresses may have large cardinality (e.g., $2^{32}$ addresses in IPv4, $2^{128}$ addresses in IPv6), using a smaller universe of data such as ASNs, which have a maximum of 65,536 numbers in existence, may provide sufficient information about the source system from which the request was received while reducing the complexity of encoding the incoming request into a latent space representation and generating a reconstruction of the incoming request from the encoding in the latent space. The contextual attributes may include, for example, information about the request itself, such as information identifying the user that generated the request, an account associated with the user, timestamp data, and the like. Information identifying the contextual attributes to use in determining whether an event is anomalous or non-anomalous may be defined by a user according to contextual information found to have been relevant to determining whether events correspond to anomalous or non-anomalous activity.

In some embodiments, the contextual information may be encoded into a compressed representation of the context information prior to encoding the incoming request into an encoding in the latent space of an autoencoder. The contextual information may be encoded using a neural network configured to compress a number of components of contextual information into an encoding representing the contextual information of the request. In some embodiments, the individual components of contextual information may be combined into a contextual information vector, and the contextual information vector may be encoded using a neural network. The request anomaly detector 114 may generate a request vector representing the incoming request including information about the event to be invoked, the contextual information vector, and an identification of the system from which the incoming request was received.

The encoder 116 may map the incoming request to an encoding in a latent space based on the request vector and a neural network trained to compress an incoming request into a code representing the incoming request. The encoder 116 may process the request vector representing the incoming request using one or more neural network layers and a bottleneck layer to select a code in a latent space representing the incoming request. In some embodiments, the one or more neural network layers may be a plurality of rectified linear units (ReLUs) that compress a request vector into a more compact representation. The bottleneck layer may use information about the parameters of a probability distribution, such as the mean and standard deviation of a probability distribution generated over the training data 132 for the incoming request, as bottleneck dimensions to encode the compressed representation of request vector x representing the incoming request generated by the one or more neural network layers into a code z in the latent space of an autoencoder. The encoder 116 may output the code z in the latent space to a decoder 118 for further processing.

Figure 2:
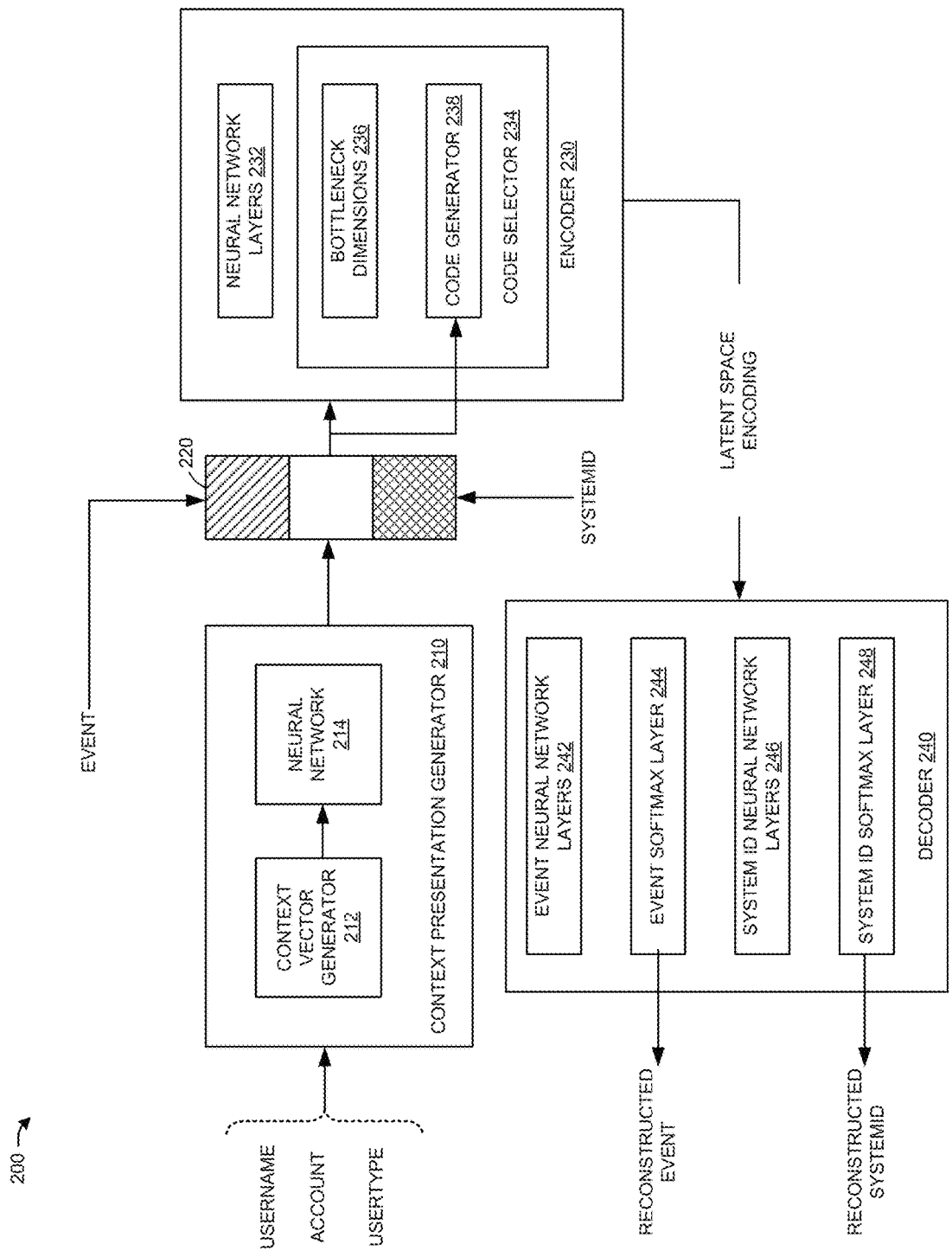
FIG. 2 illustrates an example autoencoder architecture, in accordance with one or more example embodiments of the present disclosure.

The decoder 118 may receives a code z from the encoder 116 and attempt to generate a reconstruction x' of the request attributes of the incoming request, given the contextual attributes (e.g., user name, account identification, user type, etc.) as context for the request. The decoder 118 may be structured as a plurality of neural networks configured to generate the approximation x' of the incoming request for each request attribute (e.g., the structure of the encoder 116 and the decoder 118 are shown in FIG. 2). The neural networks may include, for example, a plurality of neural network layers, such as ReLUs, that expand a code z into a larger mapping, and the output of the neural network may be processed through a probability output layer, such as a softmax layer, that generates a probability distribution that a reconstruction of the request attributes exists within a universe of known non-anomalous requests. The probability distribution for a reconstruction x' of a feature of a request x may have at least one value with a sufficiently high probability value when the request x is similar to requests that are known to be non-anomalous, while the probability distribution for the reconstruction x' may not have any values with a sufficiently high probability value when the request x is not similar to requests that are known to be non-anomalous. In some embodiments, the decoder 118 may output a normalcy score as the highest probability value in the probability distribution generated by the normalizing function, and the normalcy score may be used by the request processor 112 to determine whether to allow or disallow execution of a request, as discussed above.

While the encoder 116 and the decoder 118 are illustrated in FIG. 1A as executing on the same computing system, it should be recognized that the encoder 116 and the decoder 118 may be jointly trained but deployed on different systems. For example, the encoder 116 may execute on a first server in a distributed computing environment, and the decoder 118 may execute on a second server in the distributed computing environment. In another example, the encoder 116 may be deployed to a system from which requests to perform actions within the computing environment 100 are received, and the decoder 118 may be deployed to a request gateway that manages execution of incoming requests. In still another example, the encoder 116 and the decoder 118 may both execute on the system from which requests to perform actions within the computing environment 100 are received and may block transmission of requests that are identified as potentially anomalous so that such requests are not received at the request gateway 110.

In some embodiments, other anomaly detection techniques may be used as an alternative to or in conjunction with the autoencoder-based anomaly detection techniques discussed herein. For example, conditional noise contrastive estimation (NCE) models trained on a training data set (e.g., the training data 132) of non-anomalous requests may be used to generate anomaly scores for each incoming request. NCE anomaly scores may be used alone or in conjunction with the normalcy scores generated by an autoencoder-based anomaly detector to determine whether an incoming request is potentially anomalous and process the incoming request.

The autoencoder model trainer 120 may train the encoder 116 and decoder 118 of the autoencoder 122 used by the request anomaly detector 114 to determine whether an incoming request corresponds to anomalous or non-anomalous activity with the computing environment 100. The autoencoder model trainer 120 may train the autoencoder 122, for example, as a conditional VAE, a conditional Wasserstein autoencoder, or any other autoencoder that may reconstruct an approximation x' of an incoming request x and determine a likelihood that the incoming request x is similar to a universe of a priori known non-anomalous requests. The training data 132 used to train the autoencoder 122 to analyze incoming requests and determine whether the incoming requests are similar to normal (e.g., non-anomalous) requests in the training data 132, or are different than (e.g., anomalous) the requests in the training data 132. When the autoencoder model trainer 120 trains the autoencoder 122 as a conditional VAE, the set of variables may include input context variables c, output variables X, and Gaussian latent variables z. The autoencoder model trainer 120 may train the autoencoder 122 as a set of multilayer perceptrons. The set of multilayer perceptrons may include a recognition network $q_\phi(z|X,c)$, a conditional prior network $p_\theta(z|c)$, and a generation network $p_\theta(X|c,z)$. The model may be trained to maximize a conditional log-likelihood, and various estimation functions, such as a Stochastic Gradient Variational Bayes estimator, may be used for efficient approximation. The model may use a variational lower bound and an empirical lower bound. The variational lower bound of the model may be defined according to the equation:

$$\log p_\theta(X|c) \geq -KL(q_\phi(z|X,c)\|p_\theta(z|c)) + E_{q_\phi(z|x,c)}[\log p_\theta(X|c,z)]$$

and the empirical lower bound may be defined according to the equation:

$$\tilde{L}_{CVAE}(c, X; \theta, \phi) = -KL(q_\phi(z|X,c)\|p_\theta(z|c)) + \frac{1}{L}\sum_{l=1}^{L}\log p_\theta(X|c, z^{(l)})$$

The conditional VAE may be trained using the loss function:

$$\text{loss} = -\text{logloss}_{Event} - \text{logloss}_{systemID} + KL$$

where $\text{logloss}_{Event}$ represents the performance of the autoencoder 122 in reconstructing an event given context variables c, $\text{logloss}_{systemID}$ represents the performance of the autoencoder 122 in reconstructing the identification of the system from which a request was received given context variables c, and KL represents the KL distance between two probability distributions.

However, as shown by the graphical representation 150, when the VAE (e.g., the autoencoder 122) is trained using the above loss function that is based on KL distance, the optimized KL divergence for parameter estimation of Gaussian distribution may account for the presence of outliers 152 in sampled data (e.g., the normal data), so the distribution p(x) using KL divergence may differ significantly from the normal data (e.g., the original data from which the VAE reconstructs encoded data). The loss function using KL divergence may result in significant penalty scores for potentially anomalous data, thereby undermining the VAE's ability to detect anomalies. In contrast, by using β-divergence with MMD to determine the loss function (e.g., replacing the KL divergence loss function above with the below β-divergence loss function), the distribution p(x) using β-divergence with MMD may result in an estimate that is more robust to the outliers 152, and closer to the normal data. The graphical representation 160 shows the distribution using β-divergence with MMD. Using β-divergence with MMD may be more forgiving than KL divergence with respect to penalty scores, and therefore may facilitate improved anomaly detection when the training data 132 for the VAE includes the outliers 152. In this manner, β-divergence with MMD may allow the VAE to identify, more accurately than when compared KL divergence or other techniques, anomalous data. For example, β-cross-entropy for a single point may be defined as:

$$\mathbb{H}_\beta^i = -\frac{\beta+1}{\beta}\frac{1}{N}\left(p_\theta(x_i|z)^\beta - 1\right) +$$

$$\frac{1}{N}\sum_{k=1}^{K}p_\theta(X==k\mid z)^{\beta+1}$$

where $p_\theta(x)$ is an infinite mixture model for sample $x_i$. The reconstruction loss for a single sample using β-divergence may be represented as:

$$\mathcal{L}_{REC\text{-}\beta 2}{}^i = N\mathbb{E}_{z\sim q_\phi(z\mid x)}[\mathbb{H}_\beta^i]$$

In one or more embodiments, the VAE may use concepts of β-cross-entropy and MMD as described above. For example, the cost function to be optimized may be represented as:

$$\phi,\theta = \arg\min_{\phi,\theta}\mathbb{E}_{X\sim p_{data}(x)}[\mathcal{L}_{REC\text{-}\beta} + \mathcal{L}_{MMD}]$$

where $L_{REC\beta}$ represents the loss term per sample introduced in the reconstruction loss for a single sample using β-divergence equation shown above, and $L_{MMD}$ is the regularization term that uses MMD as a dissimilarity measure in latent dimension.

In one or more embodiments, the decoder 118 may be a non-random decoder $p_\theta(x\mid z)$, which may indicate that latent variable z may be mapped to the original dimension variables x. The algorithm used by the autoencoder model trainer 120 to train the VAE (e.g., the autoencoder 122) using RVAE-MMD is presented below in Algorithm 1.

Algorithm 1: Training a VAE with RVAE MMD
Input:
Initialize the parameters of the encoder $q_\phi(z\mid x)$ and the decoder $p_\theta(x\mid z)$.
Define the kernel k to determine MMD.
Robust divergence coefficient β≥0.
Output: ϕ, θ
1: While ϕ and θ are not converged, do:
2: Sample $\{x_1, \ldots, x_N\}$ from the training set.
3: Sample $\{z_1, \ldots, z_N\}$ from the prior p(z).
4: Sample $\{\tilde{z}_i, \ldots, \tilde{z}_N\}$ from $q_\phi(z\mid x)$.
5: Compute β-divergence term:

$$\mathcal{L}_{REC\text{-}\beta} = -\frac{\beta+1}{N\beta}\sum_{i=1}^{N}(p_\theta(x_i\mid \tilde{z}_i)^\beta - 1) + \sum_{k=1}^{K}p_\theta(X==k\mid \tilde{z}_i)^{\beta+1}$$

6: Compute MMD term:

$$\mathcal{L}'_{MMD} = \frac{1}{N(N-1)}\sum_{i=1}^{N}\sum_{j\neq i}^{N}k(z_i, z_j) + \frac{1}{N(N-1)}\sum_{i=1}^{N}\sum_{j\neq i}^{N}k(\tilde{z}_i, \tilde{z}_j) - \frac{1}{N^2}\sum_{i=1}^{N}\sum_{j=1}^{N}k(z_i, \tilde{z}_j)$$

7: Update ϕ and θ by descending the total loss: $\mathcal{L}_{TOT} = \mathcal{L}\text{REC-}\beta + \mathcal{L}\text{MMD}$
8: end while
9: Return ϕ, θ.

In one or more embodiments, the VAE may use Monte Carlo sampling to draw latent samples z times using the conditional prior network and averages the conditional likelihood to estimate a probability distribution that a reconstructed request X is in a set of likely non-anomalous requests given the input context variables c. In some embodiments, the request attributes (e.g., event type, source system/network from which the request was received) may be independent to each other given the context variables, and the VAE may generate a probability that a reconstruction of a given event and source system exists in the set of likely non-anomalous requests given the input context variables c for use as a normalcy score, as discussed above.

The activity log data store 130 may provide a data repository in which historical information about user activity within computing environment may be stored for use in training an anomaly detection model. The activity log data store 130 may be structured, for example, as a relational database, a non-relational database, a flat file store including one or more files in which user activity information is stored, and the like. The data stored in the activity log data store 130 may include information about each request processed in the computing environment 100. The information may include event information identifying the activity requested by a user and contextual information providing information about the request. The contextual information may include, for example, information about a location from which the request was generated and time at which the request was generated, username and account information, and other information that may be used in conjunction with the event information to train an anomaly detection model to generate conditional probabilities representing a likelihood that a particular user generated a request to perform a particular action at a given time and from a given location. The activity log data store 130 may be periodically augmented to include information about activity generated by new users and additional activity generated by existing users so that the anomaly detection model may be retrained.

The computing resources 140 may represent various cloud computing resources that users may execute requests against to obtain or release computing resources for use in performing a given task. The computing resources 140 may include, for example, dynamically allocable virtual machines or other cloud computing instances, cold storage instances for storing data in a persistent manner, database services used by other cloud computing instances in the computing environment 100, machine learning system instances, request routers, load balancers, and other computing resources that may be dynamically assigned to serve various users within the cloud computing environment. The request processor 112 may execute requests against the computing resources 140 when, as discussed above, the requests are determined to correspond to non-anomalous activity, or when a user indicates that potentially anomalous activity corresponds to legitimate, non-anomalous activity.

In some embodiments, the techniques described above may be used to monitor for potentially fraudulent activity by users of the computing environment 100. To determine whether a user is engaged in potentially fraudulent activity within the computing environment 100, the request anomaly detector 114 may receive a data set of historical requests generated by the user over a period of time. The data set may include a plurality of requests to perform actions within the computing environment 100, and information about each request may specify the requested action, the source device that generated the request to perform the requested action, and contextual information about any request (e.g., user ID information, account information user type information, and the like).

The request anomaly detector 114 may generate normalcy scores for each request in the plurality of requests and, in some embodiments, may calculate a distribution of the generated anomaly scores to determine whether the user is potentially engaged in fraudulent activity within the computing environment 100. For example, in calculating a distribution of the generated normalcy scores, the request anomaly detector 114 may generate a histogram showing the frequency at which ranges of normalcy scores are calculated for requests in the data set. In some embodiments, it may be assumed that a user that is not potentially engaged in fraudulent activity may be associated predominantly with requests having high normalcy scores (e.g., requests that are likely to represent expected action for the user within the computing environment 100), while a user that is potentially engaged in fraudulent activity may have a bimodal distribution of probability scores (e.g., a large number of requests having low normalcy scores and a large number of requests having high normalcy scores), or a distribution skewed towards requests having low normalcy scores. In another example, request anomaly detector may identify the number of requests in the data set having normalcy scores less than a threshold score defined for potentially anomalous events. When the number of potentially anomalous events exceeds a threshold value (e.g., an absolute number of potentially anomalous events or a percentage of the requests associated with the user for a given time period), request anomaly detector may determine that the user is potentially engaged in fraudulent activity.

When the request anomaly detector 114 determines that a user is potentially engaged in fraudulent activity, the request anomaly detector 114 may take various actions to prevent the user from generating additional activity within the computing environment 100. For example, login credentials for the user may be changed to prevent the user from logging into the computing environment 100 using previously valid login credentials or authenticating requests to perform actions in the computing environment 100 at the request gateway 110. In another example, the request gateway 110 may drop received requests associated with the user or queue such requests for execution after user confirmation that the requests are legitimate requests to perform actions within the computing environment 100 (e.g., were not generated by someone pretending to be the user).

Figure 1B:
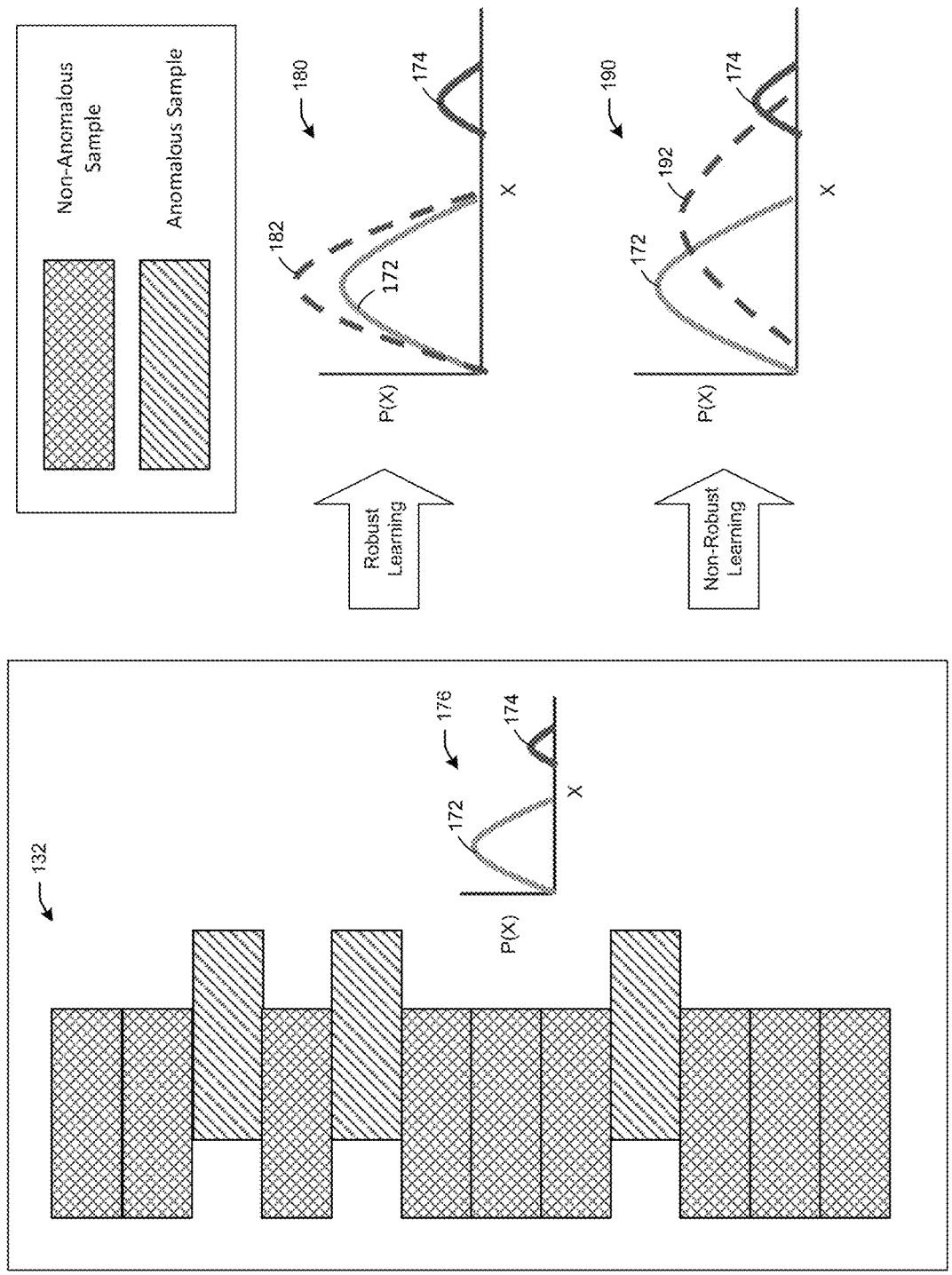
FIG. 1B illustrates an example of the training data used to train the autoencoder of the distributed computing environment of FIG. 1, in accordance with one or more example embodiments of the present disclosure.

FIG. 1B illustrates an example of the training data 132 used to train the autoencoder 122 of the distributed computing environment 100 of FIG. 1A, in accordance with one or more example embodiments of the present disclosure.

Referring to FIG. 1B, the training data 132 may include non-anomalous (e.g., normal) samples 172 and anomalous samples 174 that deviate from non-anomalous samples. For example, the non-anomalous samples may represent incoming requests to perform actions using the distributed computing environment 100, and the actions of non-anomalous samples may be indicative of normal requests (e.g., the types of requests expected from a user based on previous requests). The anomalous samples may represent incoming requests to perform actions using the distributed computing environment 100, and the actions of anomalous samples may be indicative of abnormal requests (e.g., requests different than the types of requests expected from a user based on previous requests). A graphical representation 176 (e.g., similar to the graphical representation 150 of FIG. 1A) shows a distribution $P(x)$ for x samples, where the non-anomalous samples 172 represent a distribution of normal requests included in the training data 132, and the anomalous samples 174 represent the outliers (e.g., the outliers 152 of FIG. 1A). Using robust learning with $\beta$-divergence and MMD, a graphical representation 180 shows a learned representation (e.g., using the autoencoder 122) in which the distribution of the x samples estimated using $\beta$-divergence and MMD results in a distribution similar to the non-anomalous samples 172. In contrast, a non-robust learning method without $\beta$-divergence and MMD may cause the autoencoder 122 to produce a distribution represented by the graphical representation 190 in which the x samples estimated using the non-robust learning method may result in a distribution that is significantly different than the non-anomalous samples 172 and is closer to the anomalous samples 174 (e.g., because the autoencoder 122 may have been trained using a method that does not account for the anomalous samples 174 in the training data 132). In this manner, FIG. 1B illustrates the effects of using a robust autoencoder training model using $\beta$-divergence and MMD, which may include improved autonomous learning of categorical data by the autoencoder 122.

FIG. 2 illustrates an example autoencoder architecture 200, in accordance with one or more example embodiments of the present disclosure.

The autoencoder architecture 200 may represent a model used to reconstruct an approximation x' of a request x from an encoding z and determine, based on a normalcy score calculated for the reconstruction x' of the request x, whether a request corresponds to non-anomalous activity or potentially anomalous activity within the computing environment 100 of FIG. 1A. The autoencoder architecture 200 may represent one embodiment of the autoencoder 122 of FIG. 1A trained by the autoencoder model trainer 120 of FIG. 1A, and executed within the request anomaly detector 114 of FIG. 1A. As illustrated in FIG. 2, the autoencoder architecture 200 may include a context representation generator 210, a vector 220, an encoder 230 (e.g., similar to the encoder 116 of FIG. 1A), and a decoder 240 (e.g., similar to the decoder 118 of FIG. 1A).

The context representation generator 210 may receive contextual attributes of a request to invoke an action within the computing environment 100, and may generate a reduced size representation of the contextual information, which may be used by encoder 230 to encode a request to perform an action within the computing environment 100 into a code z. As shown, the context representation generator 210 may include a context vector generator 212 and a neural network 214. The context vector generator 212 may organize the contextual information included in a request x to invoke an action within the computing environment 100 into a vector of contextual information that may be reduced into an encoded representation of the contextual information. The vector may be generated as a set of contextual attributes that are included in the request, and may exclude the request attributes included in the request x, such as the information about the event or action to be invoked by the request x and the source system that generated the request x, as the contextual information may be used to encode and reconstruct the request attributes, as discussed above. For example, the context vector may include the userName, Account, and userType attributes shown in FIG. 2, and these attributes may be used to reconstruct the event and systemID attributes at decoder 240, as discussed in further detail below.

The neural network 214 may include a plurality of fully or partially connected layers configured to map a context vector to an encoding of the context vector. The encoding of the context vector may be a reduced-size representation of the contextual attributes included in the request x. In some embodiments, neural network 214 may include a plurality of ReLU layers configured to reduce the context vector into the reduced-size representation of the contextual attributes.

After the contextual attributes included in request x have been processed by the context representation generator 210 into a reduced-size representation, the autoencoder architecture 200 may generate a request vector 220 representing the request x that is used by the encoder 230 to encode the request x into a latent space encoding z. The request vector 220 may include information about the event invoked by the request x, the reduced-size representation of the contextual attributes generated by context representation generator 210, and the identification of the system that generated the request x. As discussed, the identification of the request may be transformed from an IP address, which generally has high cardinality and may change periodically, to a more stable, smaller data space such as an Autonomous System Number that identifies the network from which the request was received.

The encoder 230 may receive the request vector 220 representing request x and may generate a latent space encoding z of the request that may be used by the decoder 240 to reconstruct an approximation of the request attributes of the request x, and to determine whether the request corresponds to non-anomalous or potentially anomalous activity within the computing environment 100. The request vector may be processed through the neural network layers 232 to compress the request vector 220 into a reduced-size representation. The output of the neural network layers 232 may be input into code selector 234, which uses parameters of a probability distribution, such as mean and standard deviation information, in the bottleneck dimensions 236 to further compress the request vector 220. The bottleneck dimensions 236 and the context vector 220 may be combined in a code generator 238 to ultimately map the request vector representing request x to a code z in the latent space. The code z may be a compressed, latent space encoding of the set of data including {event information, representation of contextual attributes, source system/network information}. The encoder 230 may output code z for further processing by a decoder 240, as discussed in further detail below.

The decoder 240 may reconstruct an approximation x' of the request x from a code z in the latent space generated by the encoder 230, as discussed above. As illustrated, the decoder 240 may include the event neural network layers 242 and the event softmax layer 244, which may be used to reconstruct the event identified in the incoming request x. The decoder 240 may include system ID neural network layers 246 and a system ID softmax layer 248, which may be used to reconstruct the system ID identified in the incoming request x.

The event neural network layers 242 may expand the latent space encoding of the request x from code z to a reconstruction of the event included in the request x. The expanded set of data generated by the event neural network layers 242 may be processed through the event softmax layer 244, which may determine a probability distribution for the reconstructed event over the universe of events used to train the autoencoder, given the attributes of username, Account, and userType as context. Based on the calculated probability distribution, the decoder 240 may identify the most likely reconstructed event (e.g., the reconstructed event associated with the highest probability in the probability distribution) and output the reconstructed event and probability associated with the reconstructed event as the normalcy score for the event. Similarly, the system ID neural network layers 246 may expand the latent space encoding of the request x from code z to a reconstruction of the system identifier (e.g., the ASN of the network from which the request was received) included in the request x. The system ID softmax layer 248 may use the expanded data set generated by the system ID neural network layers 246 to determine a probability distribution for the reconstructed system ID over the universe of events used to train the autoencoder, given the attributes of username, Account, and userType as context. The decoder 240 may output the reconstructed system ID associated with the highest probability and the probability associated with the reconstructed system ID as the normalcy score for the system ID. in some embodiments, the normalcy score for the reconstructed event and reconstructed systemID may be combined to arrive at a joint probability that the reconstructed event and system ID exist in the set of non-anomalous requests, and the joint probability may be deemed the normalcy score used to determine whether the request corresponds to anomalous activity and to process the request accordingly, as discussed above.

Figure 3A:
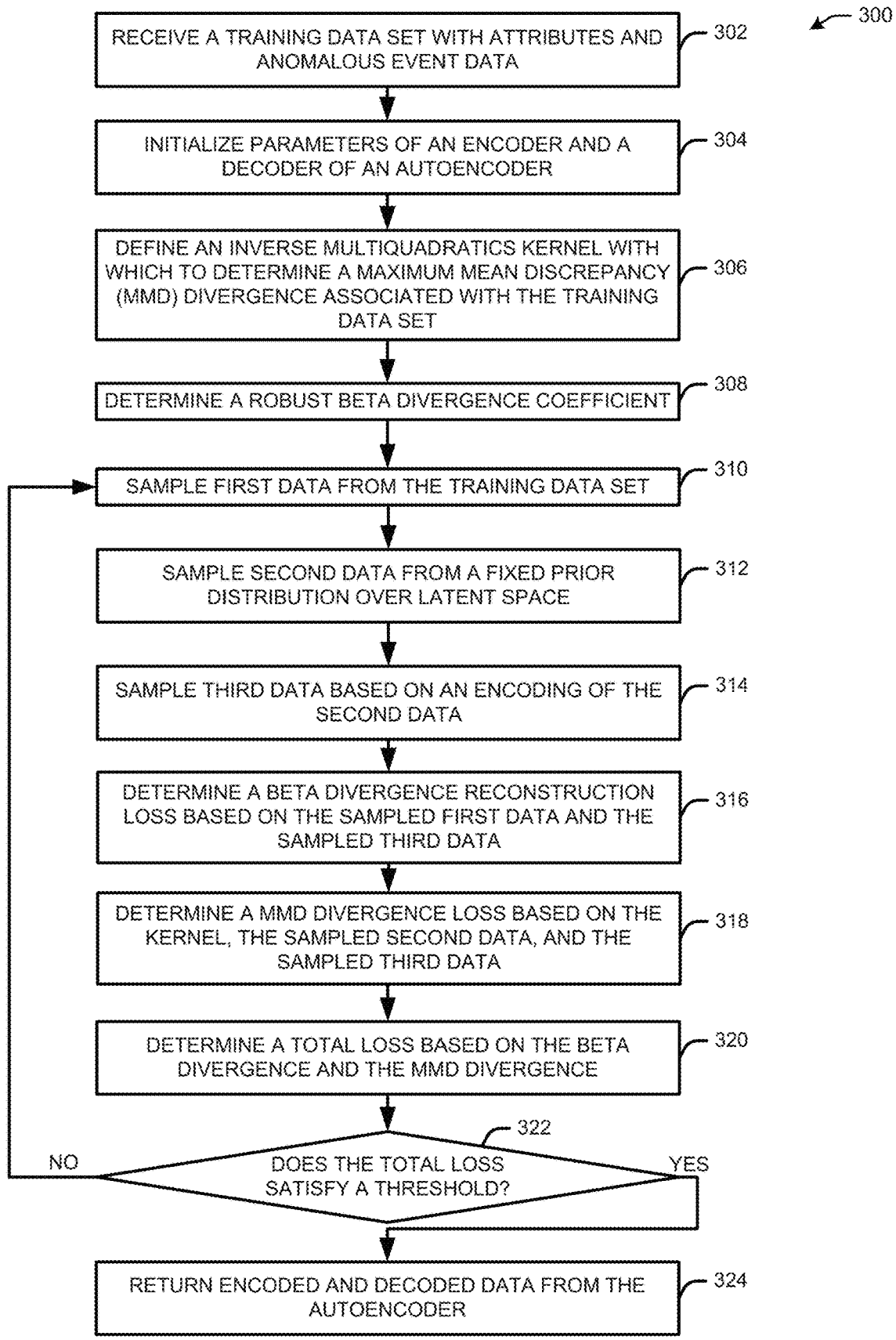
FIG. 3A illustrates a flow diagram for a process for detecting anomalous events from categorical data using autoencoders, in accordance with one or more example embodiments of the present disclosure.

FIG. 3A illustrates a flow diagram for a process 300 for detecting anomalous events from categorical data using autoencoders, in accordance with one or more example embodiments of the present disclosure.

At block 302, a device (or system, e.g., the autoencoder model trainer 120 of FIG. 1A) may receive a training data set to train an autoencoder (e.g., the autoencoder 122 of FIG. 1A). The training data set may include information about requests to invoke various operations within a distributed computing environment (e.g., the computing environment 100 of FIG. 1A). The requests may include categorical data that the device may use, individually and in combination, to train a model to estimate conditional probabilities for any attribute of a request. For example, the information may include attributes of any request, such as an application programming interface (API) call invoked by a request, a computing resource targeted by the API call, the system or network that generated the request and the like, as well as contextual information about requests received in the computing environment, such as user identification, user type information, account information (e.g., an account identifier), and other information that may provide context about requests generated by users of the computing environment.

At block 304, the device may initialize parameters of an encoder (e.g., the encoder 116 of FIG. 1A) and a decoder (e.g., the decoder 118 of FIG. 1A) of an autoencoder (e.g., the autoencoder 122 of FIG. 1A). The encoder may be represented by $q_\phi(z|x)$, and the decoder may be represented by $p_\theta(x|z)$. $q_\phi(z|x)$ may be a posterior distribution given ay a non-linear function $f_\phi$ parameterized by $\phi$. $p_\theta(x|z)$ may be a likelihood distribution over latent space Z. The autoencoder may be a VAE.

At block 306, the device may define an inverse multiquadratics kernel with which to determine a MMD divergence for categorical variables of the training data set. The kernel may be represented by $k(x,y)=C/(C+\|x-y\|_2^2)$ where $$C=2d_z\sigma_z^2,$$

where $d_z$ is the dimension of z, and C is the expected squared distance between two multivariate Guassian vectors drawn from p(z) with a standard deviation of $\sigma_z$.

At block 308, the device may determine a robust β-divergence coefficient β≥0. β-divergence may be defined as:

$$D_\beta\left(\hat{p}(X) \| p_\theta(X|z)\right) = \frac{1}{\beta}\int \hat{p}(X)^{\beta+1} dX -$$
$$\frac{\beta+1}{\beta}\int \hat{p}(X) p_\theta(X|z)^\beta dX +$$
$$\int p_\theta(X|z)^{\beta+1} dX$$

which converges to KL as $\beta$ approaches 0.

While $\theta$ and $\phi$ are not converged, the device may repeat blocks 310-320. At block 310, the device may sample $\{x_1, \ldots, x_N\}$ (e.g., first data) from the training set. The first data may include categorical data, such as an IP address associated with the request, an event name associated with the request, and the like. The categorical data may include non-numerical data (e.g., in contrast with contextual data for any event, such as an account identifier associated with a request, a user name associated with a request, a user type associated with a request, etc., which may be non-categorical, numerical data). At block 312, the device may sample $\{z_1, \ldots, z_N\}$ (e.g., second data) from the prior $p(z)$, where $p(z)$ is a fixed prior distribution over latent space Z. Unlike the first data, the second data may be numerical and not categorical. At block 314, the device may sample $\{z\sim_1, \ldots, z_N\}$ (e.g., third data) from $q_\phi(z|x)$. Unlike the first data, the third data may be numerical and not categorical. In this manner, the output of the non-categorical data to a decoder may be actual numbers, which may be concatenated with the categorical data that has been encoded using an encoder.

At block 316, the device may determine the $\beta$-divergence reconstruction loss:

$$\mathcal{L}_{REC-\beta} = -\frac{\beta+1}{N\beta}\sum_{i=1}^{N}\left(p_\theta(x_i|\tilde{z}_i)^\beta - 1\right) +$$
$$\sum_{k=1}^{K} p_\theta(X == k|\tilde{z}_i)^{\beta+1}.$$

At block 318, the device may determine the MMD divergence reconstruction loss:

$$\mathcal{L}'_{MMD} = \frac{1}{N(N-1)}\sum_{i=1}^{N}\sum_{j\neq i}^{N} k(z_i, z_j) +$$
$$\frac{1}{N(N-1)}\sum_{i=1}^{N}\sum_{j\neq i}^{N} k(\tilde{z}_i, \tilde{z}_j) -$$
$$\frac{1}{N^2}\sum_{i=1}^{N}\sum_{j=1}^{N} k(z_i, \tilde{z}_j).$$

At block 320, the device may update $\theta$ and $\phi$ by determining the total loss:

$$\mathcal{L}_{TOT} = \mathcal{L}_{REC-\beta} + \mathcal{L}_{MMD}.$$

At block 322, the device may determine whether the total loss satisfies a threshold (e.g., have $\theta$ and $\phi$ converged within a threshold amount). When the total loss satisfies the threshold, the process 300 may continue to block 324, where the device may return the $\theta$ and $\phi$ values representing the encoded and decoded values. When the total loss does not satisfy the threshold, the process 300 may return to block 310 where the device may continue to sample from the training data set. Once the autoencoder has been trained, according to the unsupervised learning process 300, in the autoencoder may be deployed (e.g., provisioned) within the computing environment (e.g., as shown in FIG. 1A) to analyze incoming requests to perform actions within the computing environment, and to process the incoming requests based on whether the incoming requests represent, based on the unsupervised learning model, normal or anomalous activity.

Figure 3B:
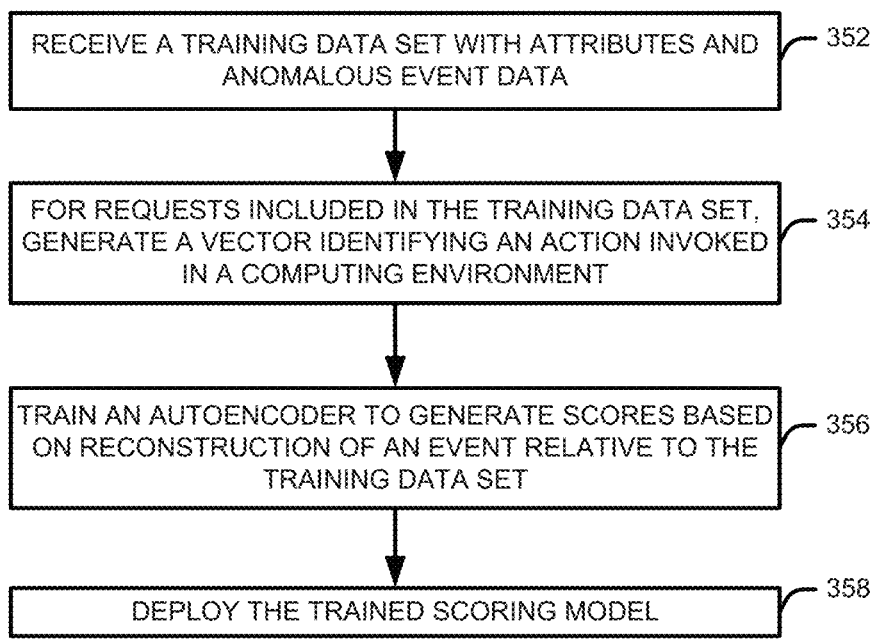
FIG. 3B illustrates a flow diagram for a process for detecting anomalous events from categorical data using autoencoders, in accordance with one or more example embodiments of the present disclosure.

FIG. 3B illustrates a flow diagram for a process 350 for detecting anomalous events from categorical data using autoencoders, in accordance with one or more example embodiments of the present disclosure.

At block 352, a device (or system, e.g., the autoencoder model trainer 120 of FIG. 1A) may receive a training data set to train an autoencoder (e.g., the autoencoder 122 of FIG. 1A). The training data set may include information about requests to invoke various operations within a distributed computing environment (e.g., the computing environment 100 of FIG. 1A). The requests may include categorical data that the device may use, individually and in combination, to train a model to estimate conditional probabilities for any attribute of a request. For example, the information may include attributes of any request, such as an application programming interface (API) call invoked by a request, a computing resource targeted by the API call, the system or network that generated the request and the like, as well as contextual information about requests received in the computing environment, such as user identification, user type information, account information (e.g., an account identifier), and other information that may provide context about requests generated by users of the computing environment.

At block 354, the device may generate a vector for any request in the training data. The vector may include the identification of the action invoked in the computing environment through the request, a representation of the contextual information, and the identification of the source system. The device may generate the representation of the contextual information using a neural network trained to encode a vector of contextual information into a reduced-size representation of the contextual information included in any request. The contextual information may include, for example, a user ID, an account type, a user type, and other information about the user invoking the request to perform an action within the computing environment.

At block 356, the device may train the autoencoder using the training data to generate an autoencoder for reconstructing requests and using the reconstruction to determine whether received requests correspond to probable anomalous activity for a user of the distributed computing system. The autoencoder may be implemented as various types of autoencoders that are configured to encode a received request into a smaller code in a latent space of the autoencoder, reconstruct an approximation x' of the received request x from the code z to which the receive request is encoded, and output a probability distribution indicating a likelihood that the reconstructed approximation x' is similar to a non-anomalous request included in the training data used to generate the autoencoder. The autoencoder may be trained using various unsupervised learning techniques in which vectors representing any request in the training data are ingested and analyzed to train the neural networks of an encoder to map requests to codes in a latent space and to train the neural networks of a decoder to extract an approximation from each code in the latent space.

At block 358, the device may deploy the trained autoencoder. In some embodiments, the trained autoencoder may be deployed to a request gateway (e.g., the request gateway 110 of FIG. 1A) for use in identifying probable anomalous requests received at the request gateway. In some embodiments, the trained autoencoder may be deployed to an application server for use in identifying anomalous activity from historical data logs and taking action based on the data in the historical data logs to prevent future occurrences of anomalous activity (e.g., by deauthorizing potentially compromised authentication credentials, blocking activity from anomalous network locations, and the like).

Figure 4:
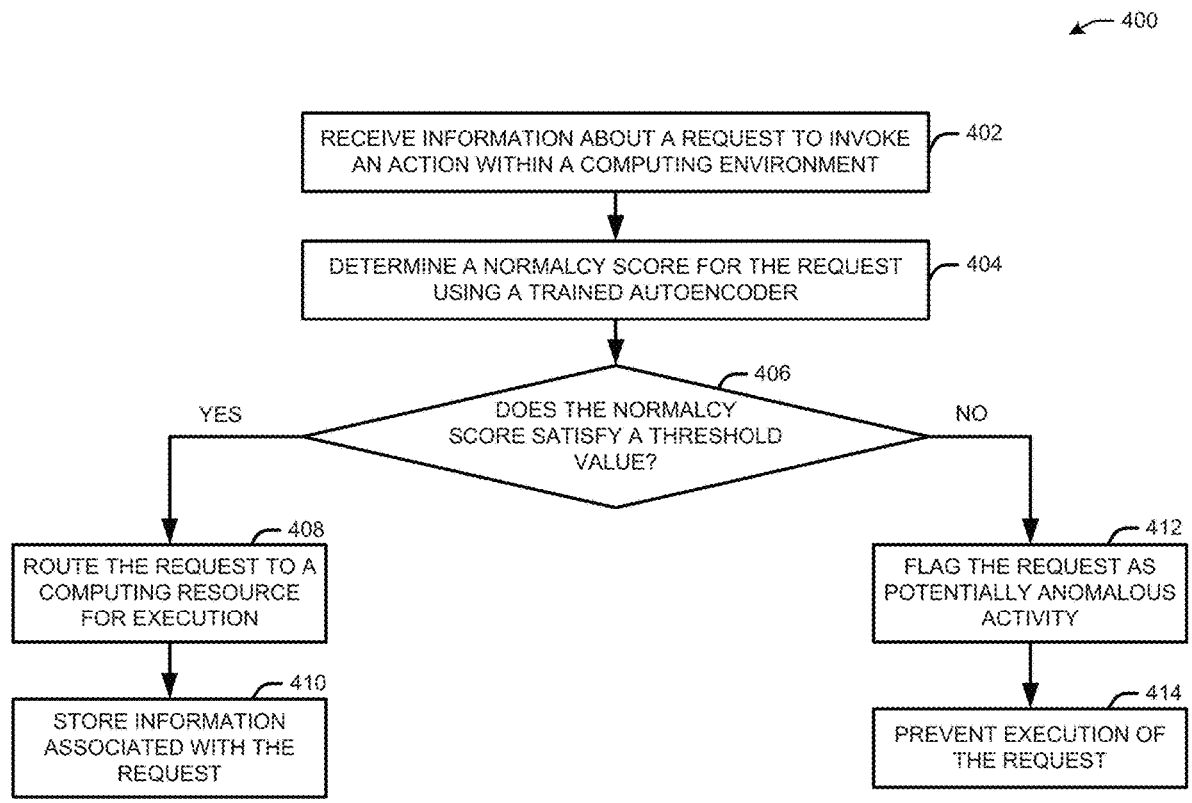
FIG. 4 illustrates a flow diagram for a process for detecting anomalous events from categorical data using autoencoders, in accordance with one or more example embodiments of the present disclosure.

FIG. 4 illustrates a flow diagram for a process 400 for detecting anomalous events from categorical data using autoencoders, in accordance with one or more example embodiments of the present disclosure.

At block 402, a device (or system, e.g., the request gateway 110 of FIG. 1A) may receive, from a user of resources in a distributed computing environment (e.g., the computing environment 100 in FIG. 1A), a request to perform an action with respect to one or more identified computing resources in the distributed computing environment. A request may include a plurality of request attributes and a plurality of contextual attributes. The request attributes may include at least information identifying the action to be performed and an identification of the source system (or network) from which the request was received. Other request attributes that may be included in a request may include, without limitation, an identification of the target computing resources (e.g., the computing resources 140 of FIG. 1A) against which the request is to be performed (e.g., a cluster of computing resources located at a particular geographic location), and other information defining an action to be performed against the target computing resources. For example, in a request to spawn a cloud computing instance, the request may include information identifying the cluster in which the cloud computing resources are to be generated, the amount of computing resources to allocate to the cloud computing instance (e.g., a number of processors, amount of memory, network interfaces, virtualizeable I/O devices, etc.), and the like. The request may further include, explicitly or implicitly, contextual information that may be used by a scoring model to determine whether a request corresponds to non-anomalous (legitimate) activity or potentially anomalous activity. Contextual attributes may include, without limitation, information about the user initiating the request, account privileges, user type information, a location from which the request was received, a timestamp indicating when the request was received, and additional contextual information that may be predictive of whether a received request corresponds to anomalous or non-anomalous activity.

At block 404, the device may generate a normalcy score for the request using a trained autoencoder. The normalcy score may be determined as a joint probability that a reconstruction of the request attributes generated by the autoencoder exists within a universe of non-anomalous activity in view of the contextual information included in the request. To generate the normalcy score for the request, the device may generate a vector representing the request by first generating a reduced-size representation of the contextual information associated with the request using a first neural network. The reduced-size representation of the contextual information may be an encoding of the contextual information in a latent space from which the contextual information may be reconstructed. The vector representing the request may be generated to include the request attributes (e.g., requested action or event, source system generating the request, etc.) and the representation of the contextual information. The vector representing the request may be encoded into a code in a latent space using an encoder portion of the autoencoder, and the code may be decoded in a decoder portion of the autoencoder to extract an approximate reconstruction of the request attributes and a normalcy score associated with the approximate reconstruction of the request attributes. The autoencoder may be trained to generate a relatively accurate reconstruction of the request attributes (e.g., a reconstruction of the request attributes that differs from the request attributes included in the incoming request by less than a threshold amount) when the incoming request is similar to non-anomalous requests used to train the autoencoder such that a normalcy score associated with the approximate reconstruction of the request attributes indicates a high probability (e.g., close to 1) that the request is in the class of non-anomalous requests with respect to the context of the request. The autoencoder may be trained to generate an inaccurate reconstruction of the request attributes when the incoming request is not similar to the non-anomalous requests used to train the autoencoder such that a normalcy score associated with the approximate reconstruction of the request indicates a low probability (e.g., close to 0) that the request is in the class of non-anomalous requests with respect to the context of the request.

At block 406, the device may determine whether the normalcy score exceeds or is equal to a threshold value. The threshold value may be defined as a minimum probability that the request attributes exist within the class of non-anomalous requests and may be calculated as a joint probability that the request attributes exist in the class of non-anomalous requests, given the contextual attributes included in the incoming request. When the normalcy score exceeds or is equal to the threshold value, the process 400 may continue at block 408 and at block 410. When the normalcy score fails to exceed or be equal to the threshold value, the process 400 may continue at block 412 and at block 414.

At block 408, the device may route the received request to the identified computing resources for execution. At block 410, the device may store information about the request in an activity data log for future analysis and/or training of the autoencoder.

At block 412, the device may flag the request as potentially anomalous activity. At block 414, the device may block execution of the request. Blocking execution may include non-performance, "black-holing" a transfer of data, blocking ports that send and/or receive data, etc.

In some embodiments, the device may request user confirmation of the requested action. To request user confirmation of the requested action, the device may use user information embedded in the request or included in contextual information about the request to query a user database for contact information for the user. The contact information may include, for example, a mobile phone number, a landline phone number, an e-mail address, or other information identifying how a user may be contacted to verify whether activity flagged as potentially anomalous corresponds to legitimate or illegitimate activity for the user. To request confirmation that the user initiated the activity, the device may, for example, send a text message, initiate a telephone call, send an e-mail message, push a notification to a mobile phone or other computing device associated with the user, or take other action based on the contact information provided by a user to the computing environment. When the user confirms that the request corresponds to legitimate activity, the device may re-designate the request as legitimate activity in the activity data log, and the activity data log may be used to re-train the autoencoder.

Figure 5:
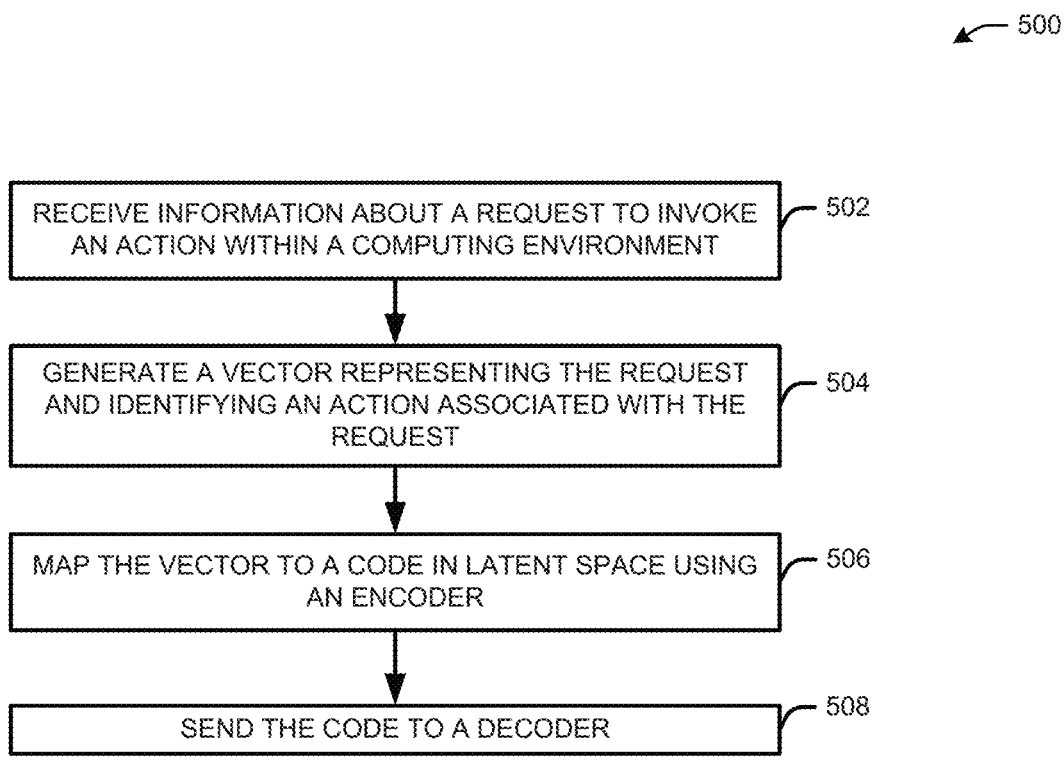
FIG. 5 illustrates a flow diagram for a process for detecting anomalous events from categorical data using autoencoders, in accordance with one or more example embodiments of the present disclosure.

FIG. 5 illustrates a flow diagram for a process 500 for detecting anomalous events from categorical data using autoencoders, in accordance with one or more example embodiments of the present disclosure.

At block 502, a device (or system, e.g., the request anomaly detector 114 of FIG. 1A) may receive information about a request to invoke an action within a computing environment (e.g., the computing environment 100 of FIG. 1A). The information may include request attributes, such as an identification of the requested action, an identification of a source system from which the request was received, and the like, and contextual information associated with the request.

At block 504, the device may generate a vector representing the request. The vector may include the identification of the requested action, a representation of the contextual information associated with the request, and the identification of the source system. As discussed, the representation of the contextual information may be generated using a first neural network configured to compress the contextual information into a reduced-size representation of the contextual information associated with the request.

At block 506, the device may map the vector representing the request to a code in a latent space. The code in the latent space may be a compressed representation of the request that a decoder component of an autoencoder may use to reconstruct an approximation of the request and determine a normalcy score for the request. The mapping may be performed using an encoder that is neural network trained, based on a training data set of non-anomalous requests, to map requests to an embedding representation in the latent space of an autoencoder. The autoencoder may be, for example, a conditional VAE or another autoencoder that may be used to reconstruct an approximation of a request from an encoding of the request in the latent space of the autoencoder.

At block 508, the device may output (e.g., send) the code to a decoder component (e.g., the decoder 118 of FIG. 1A) for further processing. In some embodiments, the code may be output directly to the decoder component of the autoencoder. In other embodiments, the code may be output to persistent or temporary memory for future analysis and/or transmission to the decoder component of the autoencoder. In some embodiments, the code may be concatenated with contextual data (e.g., information associated with a user account, a user name, a user type, etc. for the user that requested an action to be performed) and provided to the decoder component.

Figure 6:
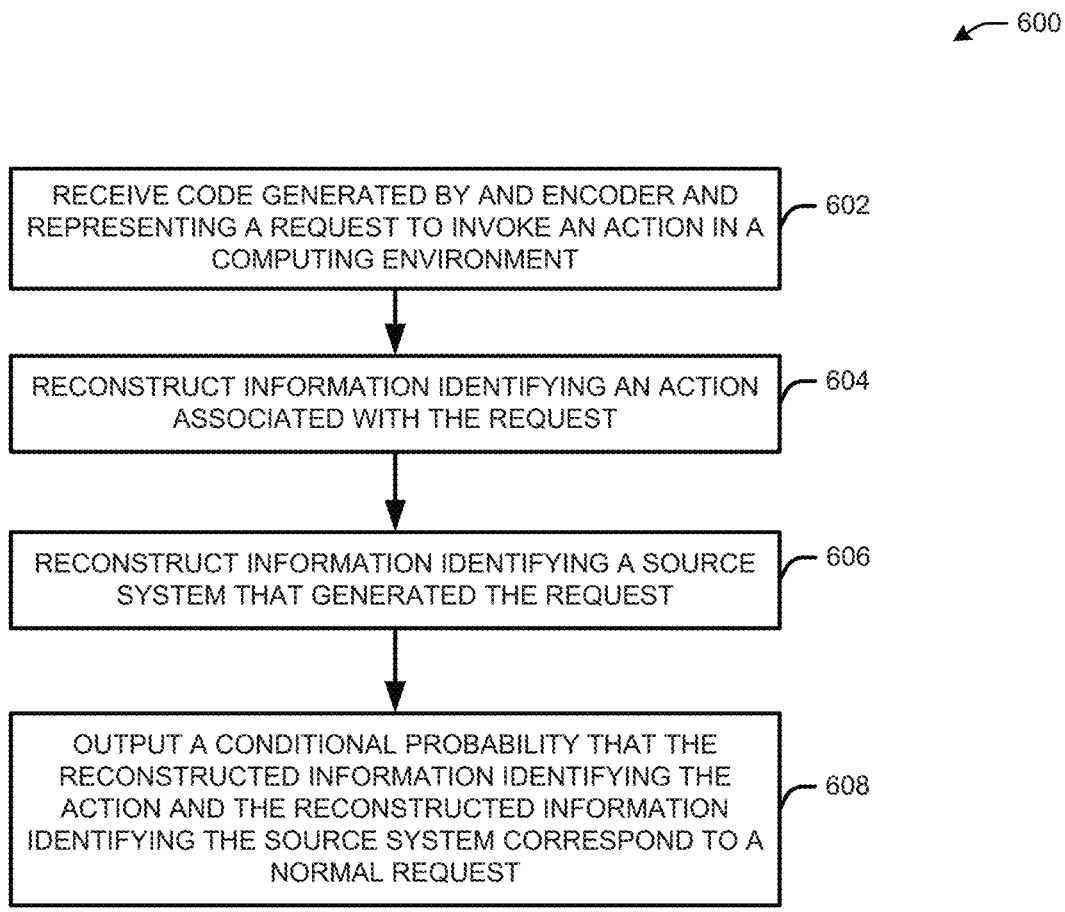
FIG. 6 illustrates a flow diagram for a process for detecting anomalous events from categorical data using autoencoders, in accordance with one or more example embodiments of the present disclosure.

FIG. 6 illustrates a flow diagram for a process 600 for detecting anomalous events from categorical data using autoencoders, in accordance with one or more example embodiments of the present disclosure.

At block 602, a device (or system, e.g., the request anomaly detector 114 of FIG. 1A) may receive code generated by an encoder (e.g. the encoder 116 of FIG. 1A). The code may be a compressed representation of a request to invoke an action in a computing environment (e.g., the computing environment 100 of FIG. 1A).

At block 604, the device may reconstruct information identifying the action invoked by the request using a first set of neural network layers in a decoder (e.g., the decoder 118 of FIG>1). The reconstruction of the information identifying the action invoked by the request may include expanding the code representing the request from the compressed representation of the request, given the contextual information included in the request. In some embodiments, reconstructing the information identifying the action invoked by the request may include generating a probability distribution over the actions included in a training data set of non-anomalous activity. The probability distribution may represent a probability that the reconstructed information identifying the action is similar to each action included in the training data set, given the contextual information included in the request as context.

At block 606, the device may reconstruct information identifying the source system that generated the request using a second set of neural network layers in the decoder. The reconstruction of the information identifying the source system that generated the request may include expanding the code representing the request from the compressed representation of the request, given the contextual information included in the request. In some embodiments, reconstructing the information identifying the source system that generated the request may include generating a probability distribution over the source systems included in a training data set of non-anomalous activity. The probability distribution generally represents a probability that the reconstructed information identifying source system is similar to each source system from which a request included in the training data set was received, given the contextual information included in the request as context.

At block 608, the device may output a conditional probability that the reconstructed information identifying the action invoked by the request and the information identifying the source system corresponds to a normal (e.g., non-anomalous) request in a training data set that includes non-anomalous requests and anomalous requests. The conditional probability that the reconstructed information about the action and the source system corresponds to a request in the training data set may be close to 1 when the request is similar to the non-anomalous requests in the training data set and may be close to 0 when the request is different from the non-anomalous requests in the training data set. The conditional probability output by the system may be used as a normalcy score that may be used to determine whether to allow or disallow execution of an incoming request, flag historical requests as potentially anomalous, and the like.

Figure 7:
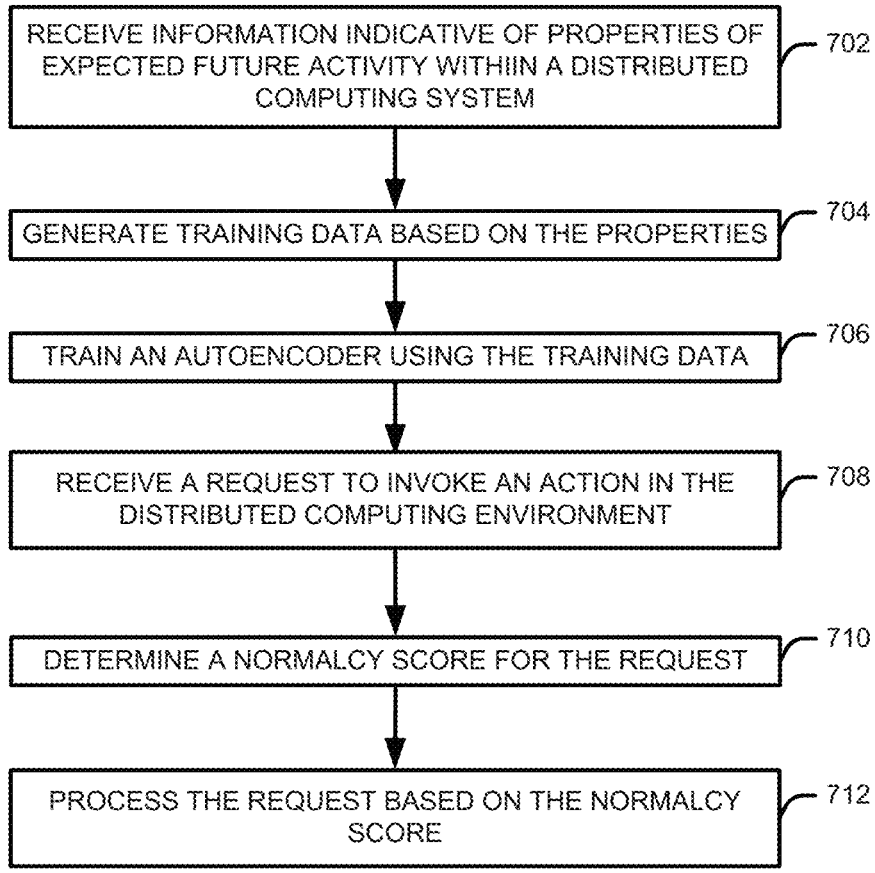
FIG. 7 illustrates a flow diagram for a process for detecting anomalous events from categorical data using autoencoders, in accordance with one or more example embodiments of the present disclosure.

FIG. 7 illustrates a flow diagram for a process 700 for detecting anomalous events from categorical data using autoencoders, in accordance with one or more example embodiments of the present disclosure.

At block 702, a device (or system, e.g., the computing environment 100 of FIG. 1A) may receive information indicating properties of expected future activity by a user within a distributed computing system (e.g., the computing environment 100 of FIG. 1A). The properties of expected future activity may include, for example, expected times at which the user plans to initiate activity within the distributed computing system, expected locations from which the user plans to generate requests to perform activity within the distributed computing system, and other contextual information that may be used in a scoring model to determine a probability score indicating a likelihood that activity corresponds to anomalous or non-anomalous activity.

At block 704, the device may generate a synthetic (e.g., training) data set by modifying historical activity data based on the properties of the expected future activity. For example, when a user indicates that future activity may be generated from a network with a specified identifier, the device may modify the obtained historical activity data to replace identifiers included in the historical activity data with the specified identifier. In another example, a user indication of a location from which future requests are to be received may also be used to modify timestamp information in the obtained historical data. For example, when the user is presently located in one country or state and expects to generate activity from another country or state in the future, the timestamps included in the obtained historical data may be modified to reflect any time zone difference between the user's current and expected future location.

At block 706, the device may train an autoencoder (e.g., the autoencoder 122 of FIG. 1A) based on the training data that includes historical activity data. In some embodiments, the historical activity data may be combined with other training data from an activity log data store (e.g., the activity log data store 130 of FIG. 1A) prior to providing a training data set to a model trainer for use in training the autoencoder. The autoencoder may be trained using various unsupervised learning techniques to generate normalcy scores for a request based on the request attributes and contextual information associated with the request. For example, the autoencoder may be trained using β-divergence with MMD.

At block 708, the device may receive a request having request attributes or contextual attributes corresponding to the indicated properties of expected future activity by the user. At block 710, the device may determine a normalcy score for the received request using the retrained request scoring model. The normalcy score may be calculated as a joint conditional probabilities for each request attribute in the received request, given various elements of user information as context. Because the retrained autoencoder may be retrained based on a synthetic data set including attributes corresponding to the expected future activity, the calculated normalcy score for the request may be calculated such that the request is indicated to correspond to non-anomalous activity within the computing environment (e.g., may be calculated from a probability distribution indicating that the received request is similar to at least one request in the training data set known to correspond to non-anomalous activity).

At block 712, the device may perform one or more actions based on the normalcy score indicating that the received request corresponds to non-anomalous activity. When a normalcy score for a request is generated in real-time, the device may allow execution of the request against the computing resources identified in the request. In another example, when a normalcy score is generated for a request that has previously been executed in the computing environment, the device may omit the request from a report identifying potentially anomalous activity within computing environment.

The examples presented herein are not meant to be limiting.

Figure 8:
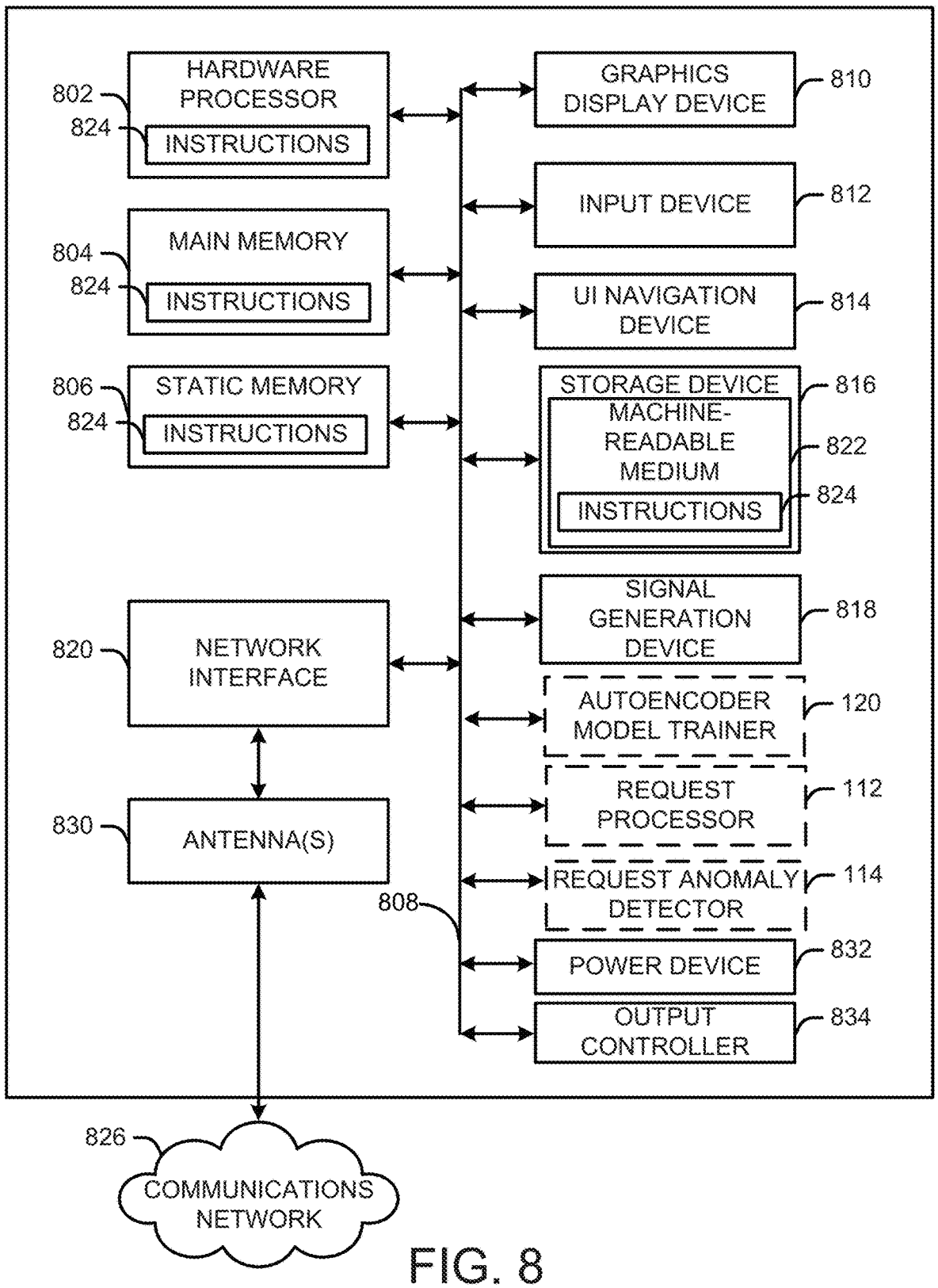
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 (e.g., implemented in whole or in part by the autoencoder model trainer 120 of FIG. 1A, the request gateway 110 of FIG. 1A, the context presentation generator 210 of FIG. 2, the encoder 230 of FIG. 2, the decoder 240 of FIG. 2) or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818, the autoencoder model trainer 120 of FIG. 1A, the request processor 112 of FIG. 1A, the request anomaly detector 114 of FIG. 1A, and a network interface device/transceiver 820 coupled to antenna (s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, interne protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for training autoencoders to detect potentially anomalous activity in a computing environment based on categorical data, the method comprising:
   receiving a training data set of requests executed within the computing environment, wherein a request in the training data set comprises a plurality of request attributes and a plurality of contextual attributes, and wherein the training data set comprises first categorical data indicative of anomalous activity in the computing environment;
   training a variational autoencoder (VAE) to reconstruct approximations of requests associated with the computing environment based on the training data set, wherein training the VAE comprises:
      determining initial parameters of an encoder of the VAE;
      determining initial parameters of a decoder of the VAE;
      determining a kernel with which to determine a maximum mean discrepancy divergence associated with the training data set;
      determining a divergence coefficient associated with the training data set, the divergence coefficient greater than or equal to zero;
      sampling first data from the training data set, the first data comprising the first categorical data;
      sampling second data from a fixed prior distribution over latent space;
      sampling third data based on an encoding of the second data, wherein the second data and the third data comprise numerical values;
      determining a beta divergence reconstruction loss associated with the training data set based on the divergence coefficient, the sampled first data, and the sampled third data;
      determining a maximum mean discrepancy reconstruction loss associated with the maximum mean discrepancy divergence based on the kernel, the sampled second data, and the sampled third data; and
      determining a total loss associated with the training data set based on the beta divergence and the maximum mean discrepancy divergence; and
   provisioning the VAE to detect, based on the training, anomalous requests to invoke an action within the computing environment.

2. The method of claim 1, further comprising:
   determining a beta cross-entropy for a data point associated with the first categorical data; and
   determining, based on the beta cross-entropy, a reconstruction loss,
   wherein determining the total loss is further based on the reconstruction loss.

3. The method of claim 1, wherein determining the beta divergence reconstruction loss is based on determining a mapping of a latent variable to an input space.

4. The method of claim 1, further comprising:
   receiving a request to invoke an action within the computing environment;
   determining that the request is associated with anomalous activity; and
   blocking execution of the request.

5. A method for training autoencoders to detect potentially anomalous activity in a computing environment based on categorical data, the method comprising:
   receiving a data set associated with actions requested within the computing environment, wherein a request in the data set comprises attributes, and wherein the data set comprises first categorical data indicative of anomalous activity in the computing environment;
   training an autoencoder to reconstruct approximations of requests associated with the computing environment based on the data set, wherein training the autoencoder comprises:
      sampling first data from the data set, the first data comprising the first categorical data;
      sampling second data from a fixed prior distribution over latent space;
      sampling third data based on an encoding of the second data, wherein the second data and the third data comprise numerical values;
      determining a beta divergence reconstruction loss associated with the data set based on the sampled first data and the sampled third data;
      determining a maximum mean discrepancy reconstruction loss associated with the maximum mean discrepancy divergence based on the sampled second data and the sampled third data; and
      determining a total loss associated with the data set based on the beta divergence and the maximum mean discrepancy divergence; and
   provisioning the trained autoencoder to detect, based on the training, anomalous requests to invoke an action within the computing environment.

6. The method of claim 5, wherein the autoencoder is a variational autoencoder (VAE).

7. The method of claim 5, further comprising determining a divergence coefficient associated with the data set, the divergence coefficient greater than or equal to zero, wherein determining the beta divergence reconstruction loss associated with the data set is further based on the divergence coefficient.

8. The method of claim 5, further comprising determining a kernel,
wherein determining the maximum mean discrepancy reconstruction loss is further based on the kernel.

9. The method of claim 5, wherein the attributes comprise request attributes and contextual attributes.

10. The method of claim 5, further comprising determining a beta cross-entropy,
wherein determining the total loss is further based on the beta cross-entropy.

11. The method of claim 5, further comprising:
receiving a request to invoke an action within the computing environment;
generating a reconstruction of the request to invoke the action using the trained autoencoder;
determining a normalcy score based on a probability that the reconstruction of the request exists in the data set;
determining that the request is a potentially anomalous request based on a comparison of the normalcy score to a threshold value; and
blocking execution of the request.

12. The method of claim 5, further comprising:
receiving information indicative of properties of expected future requests within the computing environment that are expected to be flagged as potentially anomalous activity; and
generating a training data set by modifying historical activity within the computing environment based on the properties of the expected future requests; and
wherein the data set comprises the training data set.

13. The method of claim 5, further comprising:
receiving a request to invoke an action within the computing environment;
generating a vector including an action invoked by a request of the data set, context information, and an identification of a system that generated the request;
mapping the vector to a code in a latent space using a first neural network; and
generating an approximation of the invoked action and an approximation of the identification of the system that generated the request by decoding the code in the latent space using a second neural network.

14. The method of claim 13, wherein mapping the vector to the code in the latent space comprises:
processing the vector through neural network layers;
determining a probability distribution generated by the neural network layers; and
selecting the code based on the vector and parameters associated with the probability distribution.

15. The method of claim 13, wherein the second neural network comprises a plurality of neural network layers and a probability output layer for the invoked action and the identification of the system that generated the request.

16. A system for training autoencoders to detect potentially anomalous activity in a computing environment based on categorical data, the system configured to:
receive a data set associated with actions requested within the computing environment, wherein a request in the data set comprises attributes, and wherein the data set comprises first categorical data indicative of anomalous activity in the computing environment;
train an autoencoder to reconstruct approximations of requests associated with the computing environment based on the data set, wherein training the autoencoder comprises:
sample first data from the data set, the first data comprising the first categorical data;
sample second data from a fixed prior distribution over latent space;
sample third data based on an encoding of the second data, wherein the second data and the third data comprise numerical values;
determine a beta divergence reconstruction loss associated with the data set based on the sampled first data and the sampled third data;
determine a maximum mean discrepancy reconstruction loss associated with the maximum mean discrepancy divergence based on the sampled second data and the sampled third data; and
determine a total loss associated with the data set based on the beta divergence and the maximum mean discrepancy divergence; and
provisioning the trained autoencoder to detect, based on the training, anomalous requests to invoke an action within the computing environment.

17. The system of claim 16, wherein the autoencoder is a variational autoencoder (VAE).

18. The system of claim 16, wherein the system is further configured to determine a divergence coefficient associated with the data set, the divergence coefficient greater than or equal to zero,
wherein to determine the beta divergence reconstruction loss associated with the data set is further based on the divergence coefficient.

19. The system of claim 16, wherein the system is further configured to determine a kernel,
wherein to determine the maximum mean discrepancy reconstruction loss is based on the kernel.

20. The system of claim 16, wherein the attributes comprise request attributes and contextual attributes.

* * * * *